356-369 SR
3/3/87 OR H 000,230

United States Statutory Invention Registration [19]

[11] Reg. Number: H230
[43] Published: Mar. 3, 1987

Smith

[54] APPARATUS FOR NON-DESTRUCTIVE INSPECTION OF BLIND HOLES

[75] Inventor: Tennyson Smith, Orem, Utah

[73] Assignee: The United States of America as represented by the Secretary of the Air Force, Washington, D.C.

[21] Appl. No.: 689,115

[22] Filed: Jan. 7, 1985

[51] Int. Cl.[4] ..... G01J 4/00
[52] U.S. Cl. ..... 356/369; 356/364
[58] Field of Search ..... 356/369, 364, 241

[56] References Cited

U.S. PATENT DOCUMENTS

| | | | |
|---|---|---|---|
| 3,699,350 | 10/1972 | Holdaway | 250/225 |
| 3,761,186 | 9/1973 | Wason | 356/241 |
| 4,315,688 | 2/1982 | Pryor | 356/73 |
| 4,381,151 | 4/1983 | Smith | 356/369 |

FOREIGN PATENT DOCUMENTS

| | | | |
|---|---|---|---|
| 195612 | 6/1971 | Fed. Rep. of Germany | 356/432 |
| 0082952 | 6/1980 | Japan | 356/241 |

*Primary Examiner*—Stephen C. Buczinski
*Assistant Examiner*—Linda J. Wallace
*Attorney, Agent, or Firm*—Donald J. Singer; James E. Maslow

[57] ABSTRACT

A miniaturized ellipsometric testing device having a laser for precisely impinging a prescribed beam of light upon a surface to be tested and a detector for capturing the reflected impinged beam only within prescribed limits. The value of the reflected impinged beam, which is transmissible to the detector, is used in determination of the validity of the surface tested; the miniaturized device is couplable to the laser light source and the detector by fiber optic cables.

7 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

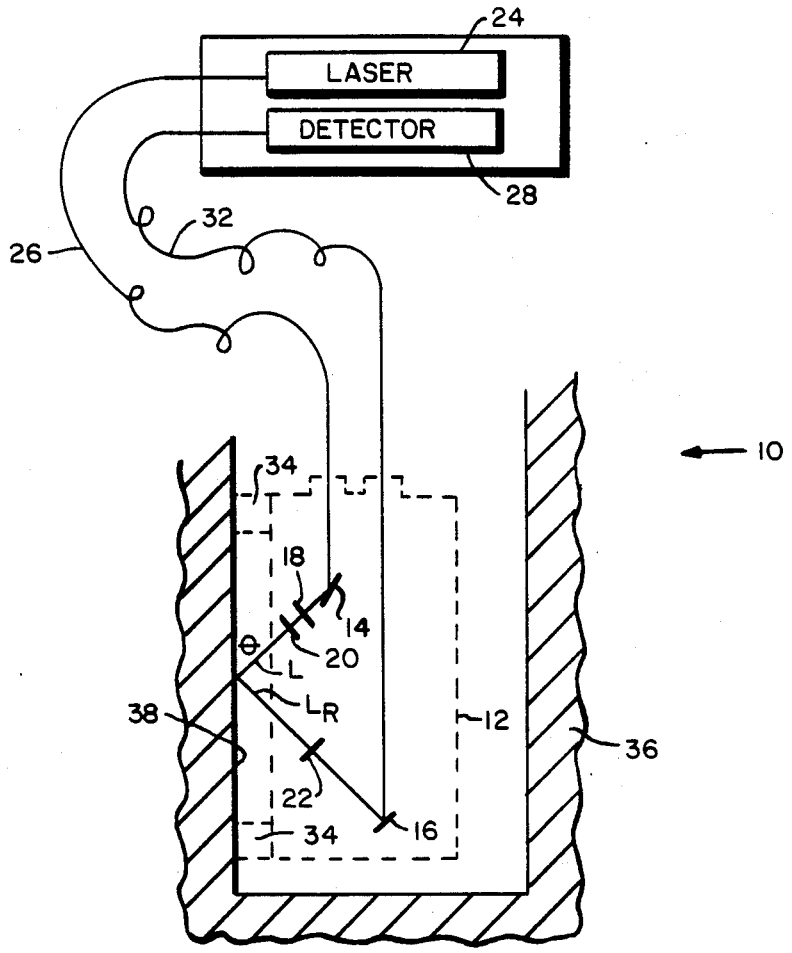
24
LASER
DETECTOR
28
32
26
10
34
18
14
20
θ
L
LR
38
12
36
22
34
16

APPARATUS FOR NON-DESTRUCTIVE INSPECTION OF BLIND HOLES

STATEMENT OF GOVERNMENT INTEREST

The invention described herein may be manufactured and used by or for the Government for governmental purposes without the payment of any royalty thereon.

BACKGROUND OF THE INVENTION

The present invention relates to contamination testers, and more particularly, to an apparatus for non-destructive inspection of blind holes.

In order to achieve maximum efficiency of performance in high technology products—such as airfoils, engines, etc.—special non-destructive inspection (NDI) discipline has developed. To date, NDI tools have been developed which are very sensitive to surface contamination. These tools include surface potential difference, photoelectron emission and ellipsometric testers.

The problem is to develop NDI tools which can perform in even the closest of areas. This arsenal should be one that can inspect all areas of surface-treated panels or parts. The need for sophisticated equipment that can scan curved or shaped parts is characterized by the critical nature of and the great number of parts to be inspected.

The solution to the problem lies in the development of NDI tools that can detect deviations from an acceptable surface condition norm. The first step involves characterization of an acceptable surface, i.e., identification of the boundaries of signals from various surface tools for which the surface is acceptable. The second step involves establishing which tools can detect which deviations from the acceptable surface. The third step involves scanning of surfaces with the surface tools to identify regions that deviate from the acceptance band (i.e., that are contaminated).

Ellipsometry is one NDI reflective technique wherein the sample is not touched by the instrument. In one embodiment, a beam of polarized monochromatic light is reflected from the surface. Although the incident beam is plane polarized at an azimuth of 45° with respect to the plane of incidences (POI), the reflected beam is elliptically polarized. The parameters measured by the ellipsometer are the phase shift $\Delta$ of light polarized perpendicular to the POI with respect to that polarized parallel to the POI and $\psi$, the arctangent of the reflection coefficients for these components. An advantage of the ellipsometer is that $\Delta$ and $\psi$ are absolute values that are not dependent on the absolute light intensities but only on the ratio of the intensities. Although $\psi$ is very sensitive to surface roughness, it is relatively insensitive to the thickness of dielectric (e.g., oxide) films on the surface. In contrast, $\Delta$ is extremely sensitive to film thickness and relatively insensitive to surface roughness. The phase shift $\Delta$ can be used to detect as little as 0.1 $\lambda$ to as much as 5000 $\lambda$ of oxide or hydroxide on a properly anodized aluminum surface or a film of contamination on top of the oxide with the same resolution.

The present invention is an adaptation of a hand-holdable contamination tester employing an off-null ellipsometric technique which is disclosed in my U.S. Pat. No. 4,381,151, and reference should be made thereto for further background information.

This device and other known ellipsometric devices fail, however, to be operable in regions such as small "blind holes". In many instances it is necessary to prepare surfaces for painting, adhesive bonding, electroplating, etc., in blind holes that are difficult or impossible to reach with normally used surface tools.

It is therefore an object of the present invention to provide an off-null ellipsometric device which is operable in hard to reach regions such as blind holes.

SUMMARY OF THE INVENTION

The present invention comprises a miniaturized ellipsometric testing device comprising first means for precisely impinging a prescribed beam of light upon a surface to be tested and second means for capturing the reflected impinged beam only within prescribed limits. The value of the reflected impinged beam, which is transmissible to a detector, enable determination of the validity of the surface tested; the miniaturized device is couplable to a laser light source and said detector by means of respective fiber optic cables.

BRIEF DESCRIPTION OF THE DRAWINGS

The invention will be more clearly understood by reference to the following detailed description of a preferred embodiment thereof in conjunction with the accompanying drawing, which is a schematic diagram of the present invention.

DETAILED DESCRIPTION OF THE DRAWINGS

The presently disclosed miniaturized ellipsometer 10 is shown in FIG. 1 inside a blind hole 36, and having a small frame 12 (shown in dashed-line) which houses miniaturized, optically alligned, ellipsometric components, comprising mirrors 14 and 16, plane polarizer 18, compensator (quarter wave plate) 20, and analyzer (polarizer) 22. The first mirror 14 is coupled to a light source such as laser 24 by means of fiber optic cable 26 and the second mirror 16 is coupled to a detector (such as a photodector) 28 by means of fiber optic cable 32. Feet are provided to precisely orient the sensor to the surface to be tested.

Fiber optic cables 26 and 32 are affixed to housing 12 in a manner which assures a fixed angle of reflection at mirrors 14 and 16, as will be appreciated by those of ordinary skill in the art. Preferrably polarizer 18 and analyzer 22 each comprise a Glan-Thompson prism.

In operation, the sensor housing 12 is entered into a blind hole 36 and is oriented against the surface to be tested 38 by means of feet. The light signal from laser 24 enters the fiber optic cable 26 and is reflected by fixed mirror 14 through element 18, plane polarizing the beam of light L thereat. Thence, the light beam L is directed through quarter wave plate compensator 20 to impinge upon surface 38 at an angle of incidence $\theta$. The reflected beam $L_R$ under ideal conditions will be reflected also at angle $\theta$ through polarizing analyzer 22 to mirror 16. Element 22 and mirror 16 cooperate to transmit via cable 32 to detector 28 only that sample of light which is acceptabley reflected by surface 38. Where surface 38 is aberrant, reflections of beam L will result in beam $L_R$ at other than at angle $\theta$, with possible less coherent characteristics, all as will result in a diminished amount of light power being present in the beam delivered to detector 28. The value of the beam which is detected can then represent the reflective (i.e., contamination) characteristics of the surface under test.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. An appartus with a light source and a detector for the non-destructive testing for contamination of surfaces in blind holes, comprising:

a miniaturized housing which is placeable in a blind hole, separate from said source and detector, having means of impinging a beam of light of a known value from said light source upon said surface to be tested, and means for transmitting to said detector only that portion of said impinged light beam which is reflected within a prescribed optical path by said surface.

2. The apparatus of claim 1, wherein said first means comprises a mirror, a polarizer, and a compensator for directing said beam onto said surface at a prescribed angle.

3. The apparatus of claim 1, wherein said second means comprises a polarizing analyzer and a mirror.

4. The apparatus of claim 1 wherein said housing is couplable to said light source and to said detector by means of respective fiber optic cables.

5. The apparatus of claim 1, wherein said housing further comprises at least one foot for orienting said housing against said surface.

6. The apparatus of claim 2, wherein said polarizer comprises a Glan-Thompson prism.

7. The apparatus of claim 3, wherein said analyzer comprises a Glan-Thompson prism.

* * * * *